United States Patent
Mohan

(10) Patent No.: US 10,289,734 B2
(45) Date of Patent: May 14, 2019

(54) ENTITY-TYPE SEARCH SYSTEM

(71) Applicant: Samsung Electronics Co., Ltd., Suwon-si, Gyeonggi-do (KR)

(72) Inventor: Sudhir Mohan, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 15/269,841

(22) Filed: Sep. 19, 2016

(65) Prior Publication Data

US 2017/0083606 A1    Mar. 23, 2017

Related U.S. Application Data

(60) Provisional application No. 62/220,737, filed on Sep. 18, 2015.

(51) Int. Cl.
*G06F 17/30* (2006.01)

(52) U.S. Cl.
CPC .............. *G06F 17/30864* (2013.01)

(58) Field of Classification Search
CPC ....... G06F 17/305498; G06F 17/30887; G06F 17/30864; G06F 17/30477; G06F 17/30554; G06F 17/30; G06F 17/30598
See application file for complete search history.

(56) References Cited

U.S. PATENT DOCUMENTS

| | | | | |
|---|---|---|---|---|
| 8,775,439 B1* | 7/2014 | Lasko | ............... | G06F 17/30864 707/748 |
| 8,843,466 B1* | 9/2014 | Zeiger | ............... | G06F 17/30864 707/706 |
| 8,856,099 B1* | 10/2014 | Lasko | ............... | G06F 17/30864 707/706 |
| 9,785,696 B1* | 10/2017 | Yakhnenko | ....... | G06F 17/30598 707/E17.014 |
| 2005/0160104 A1* | 7/2005 | Meera | ........................ | G06F 8/20 707/E17.028 |
| 2007/0192310 A1* | 8/2007 | Takagi | ............... | G06F 17/30038 707/E17.009 |
| 2008/0229240 A1* | 9/2008 | Garbow | ............ | G06F 17/30864 715/810 |
| 2008/0306908 A1* | 12/2008 | Agrawal | ............... | G06F 17/278 707/E17.14 |

(Continued)

*Primary Examiner* — Anh Ly
(74) *Attorney, Agent, or Firm* — Jefferson IP Law, LLP

(57) ABSTRACT

A method includes receiving a search query from a user device and selecting entity type records from an entity type data store based on the query. Each of the entity type records includes an entity type name and entity type facets that each include terms descriptive of the entity type name. Selecting the entity type records includes identifying matches between the entity type facets and the query. The method includes selecting function records from a function data store based on the query and the entity type names from the selected entity type records. Each of the function records includes an entity type field with entity type names; an access URL template; instructions for completing the access URL template; and function facets with terms descriptive of an application state accessed using the completed access URL. The method includes returning search results including the completed access URLs to the user device.

18 Claims, 9 Drawing Sheets

(56) References Cited

U.S. PATENT DOCUMENTS

| | | | |
|---|---|---|---|
| 2009/0299824 A1* | 12/2009 | Barnes, Jr. | G06F 3/04847 |
| | | | 705/7.39 |
| 2009/0313041 A1* | 12/2009 | Eder | G06N 5/022 |
| | | | 705/2 |
| 2011/0088011 A1* | 4/2011 | Ouali | G06F 8/10 |
| | | | 717/105 |
| 2014/0172911 A1* | 6/2014 | Cohen | H04L 67/42 |
| | | | 707/770 |
| 2014/0201179 A1* | 7/2014 | Chang | G06F 17/30864 |
| | | | 707/706 |
| 2016/0012051 A1* | 1/2016 | Zoryn | G06F 17/30533 |
| | | | 707/739 |
| 2016/0085515 A1* | 3/2016 | Ben-Tzur | G06F 8/20 |
| | | | 717/109 |
| 2016/0188684 A1* | 6/2016 | Glover | G06F 17/30864 |
| | | | 707/722 |
| 2016/0189225 A1* | 6/2016 | Glover | G06F 17/30864 |
| | | | 705/14.55 |

\* cited by examiner

ENTITY-TYPE SEARCH SYSTEM

CROSS-REFERENCE TO RELATED APPLICATIONS

The present application claims the benefit of U.S. Provisional Application No. 62/220,737, filed on Sep. 18, 2015. The entire disclosure of the application referenced above is incorporated by reference.

FIELD

This disclosure relates to techniques for generating search results, and more particularly to generating search results based on entity types of interest to a user.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Search systems can be utilized in many different fields. Most search systems utilize crawlers to identify content. A search system can index crawled content, such that the search system is able to search the crawled content. Many applications, however, are difficult or impossible to crawl. For instance, social networking applications such as TWITTER and FACEBOOK have real-time content feeds. In the case of a real-time content feeds, it is difficult for a crawler to crawl all possible updates to all possible content feeds of an application. Further, even if a crawler were to crawl these content feeds, the relevance of the crawled content diminishes as time passes. Thus, at query time, the most relevant content may not yet be indexed. In another example, some applications allow users to provide different types of search parameters when executing specialized searches. For example, the YELP application by Yelp, Inc. allows users to enter different attributes (e.g., cost, cuisine type, location, outdoor seating available, etc) as additional search parameters. This creates a combinatorial explosion of crawlable states of the YELP application due to the vast number of locations and other searchable attributes.

SUMMARY

In a feature, a method includes: receiving a search query from a user device via a network; and selecting a plurality of entity type records included in an entity type data store based on the received search query. Each of the entity type records includes: an entity type name; and one or more entity type facets, each of which include terms that are descriptive of the entity type name, where selecting the plurality of entity type records includes identifying matches between terms in the one or more entity type facets and terms of the search query. The method further includes: selecting a plurality of function records included in a function data store based on at least one of the search query and the entity type names from the selected plurality of entity type records, each of the function records including: an entity type field including one or more entity type names; an access uniform resource locator (URL) template and instructions for completing the access URL template to form a completed access URL; and one or more function facets including terms that are descriptive of an application state accessed using the completed access URL. The method further includes transmitting search results to the user device via the network, the search results including the completed access URLs from the selected function records.

In further features, the method further includes selecting the plurality of function records based on matches between the entity type names of the selected plurality of entity type records and the entity type names of the entity type fields in the function records.

In further features, the method further includes selecting the plurality of function records based on matches between the search query and terms of the one or more function facets.

In further features, the method further includes generating the entity type records in the entity type data store based on entity records included in an entity data store, where each of the entity records includes an entity name, an entity type indicating a category of the entity name, and entity information related to the entity name.

In further features, for N of the function records, the instructions for completing the access URL template includes instructions for inserting the search query into the access URL template, where N is an integer greater than zero.

In further features, a method includes: receiving a search query from a user device via a network; and selecting a plurality of entity type records included in an entity type data store based on the received search query. Each of the entity type records includes: an entity type name; and one or more entity type facets, each of which include terms that are descriptive of the entity type name, where selecting the plurality of entity type records includes identifying matches between terms in the one or more entity type facets and terms of the search query. The method further includes: selecting a plurality of function records included in a function data store based on at least one of the search query and the entity type names from the selected plurality of entity type records, each of the function records including: an entity type field including one or more entity type names; an access uniform resource locator (URL) template and instructions for completing the access URL template to form a completed access URL; and one or more function facets including terms that are descriptive of an application state accessed using the completed access URL. The method further includes: accessing application states using the completed access URLs of the plurality of function records; generating a final set of search results based on the accessed application states; and transmitting the final set of search results to the user device via the network.

In further features, the completed access URLs are search URLs, and accessing the application states includes: performing a plurality of third party searches using the search URLs; and receiving third party search results from the third party searches.

In further features, generating the final set of search results includes selecting a set of third party search results, and transmitting the final set of search results to the user device includes transmitting the selected set of third party search results.

In further features, the method further includes generating the completed access URLs by including terms from the search query into the access URL template according to the instructions.

In further features, generating the final set of search results includes selecting a set of third party search results and scoring the set of third party search results, and transmitting the final set of search results to the user device includes transmitting the selected and scored set of third party search results.

In a feature, a search system is described. The search system includes at least one processing unit and a computer readable medium including instructions executed by the at least one processing unit to perform a method. The method includes: receiving a search query from a user device via a network; and selecting a plurality of entity type records included in an entity type data store based on the received search query. Each of the entity type records includes: an entity type name; and one or more entity type facets, each of which include terms that are descriptive of the entity type name, where selecting the plurality of entity type records includes identifying matches between terms in the one or more entity type facets and terms of the search query. The method further includes selecting a plurality of function records included in a function data store based on at least one of the search query and the entity type names from the selected plurality of entity type records, each of the function records including: an entity type field including one or more entity type names; an access uniform resource locator (URL) template and second instructions for completing the access URL template to form a completed access URL; and one or more function facets including terms that are descriptive of an application state accessed using the completed access URL. The method further includes: transmitting search results to the user device via the network, the search results including the completed access URLs from the selected function records.

In further features, the first instructions further include instructions for selecting the plurality of function records based on matches between the entity type names of the selected plurality of entity type records and the entity type names of the entity type fields in the function records.

In further features, the first instructions further include instructions for selecting the plurality of function records based on matches between the search query and terms of the one or more function facets.

In further features, the first instructions further include instructions for generating the entity type records in the entity type data store based on entity records included in an entity data store, where each of the entity records includes an entity name, an entity type indicating a category of the entity name, and entity information related to the entity name.

In further features, for N of the function records, the second instructions for completing the access URL template includes instructions for inserting the search query into the access URL template, where N is an integer greater than zero.

In further features, the first instructions further include instructions for: accessing application states using the completed access URLs of the plurality of function records; and generating a final set of search results based on the accessed application states, and the first instructions for transmitting search results to the user device via the network include instructions for transmitting the final set of search results to the user device via the network.

In further features, the completed access URLs are search URLs, the first instructions for accessing the application states include instructions for: performing a plurality of third party searches using the search URLs; and receiving third party search results from the third party searches, and the first instructions for generating a final set of search results include instructions for generating the final set of search results based on the third party search results.

In further features, the first instructions for generating the final set of search results include instructions for selecting a set of third party search results, and the first instructions for transmitting the final set of search results to the user device include instructions for transmitting the selected set of third party search results.

In further features, the first instructions for generating the completed access URLs include instructions for generating the completed access URLs by including terms from the search query into the access URL template according to the second instructions.

In further features, the first instructions for generating the final set of search results include instructions for selecting a set of third party search results and scoring the set of third party search results, and the first instructions for transmitting the final set of search results to the user device include instructions for transmitting the selected and scored set of third party search results to the user device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The details of one or more examples are set forth in the accompanying drawings and the description below. Other features, objects, and advantages will be apparent from the description and drawings, and from the claims.

DETAILED DESCRIPTION

The figures and the following description relate to example implementations by way of illustration only. It should be noted that from the following discussion, alternative implementations of the structures and methods disclosed herein will be readily recognized as viable alternatives that may be employed without departing from the scope of the disclosure.

Figure 1:
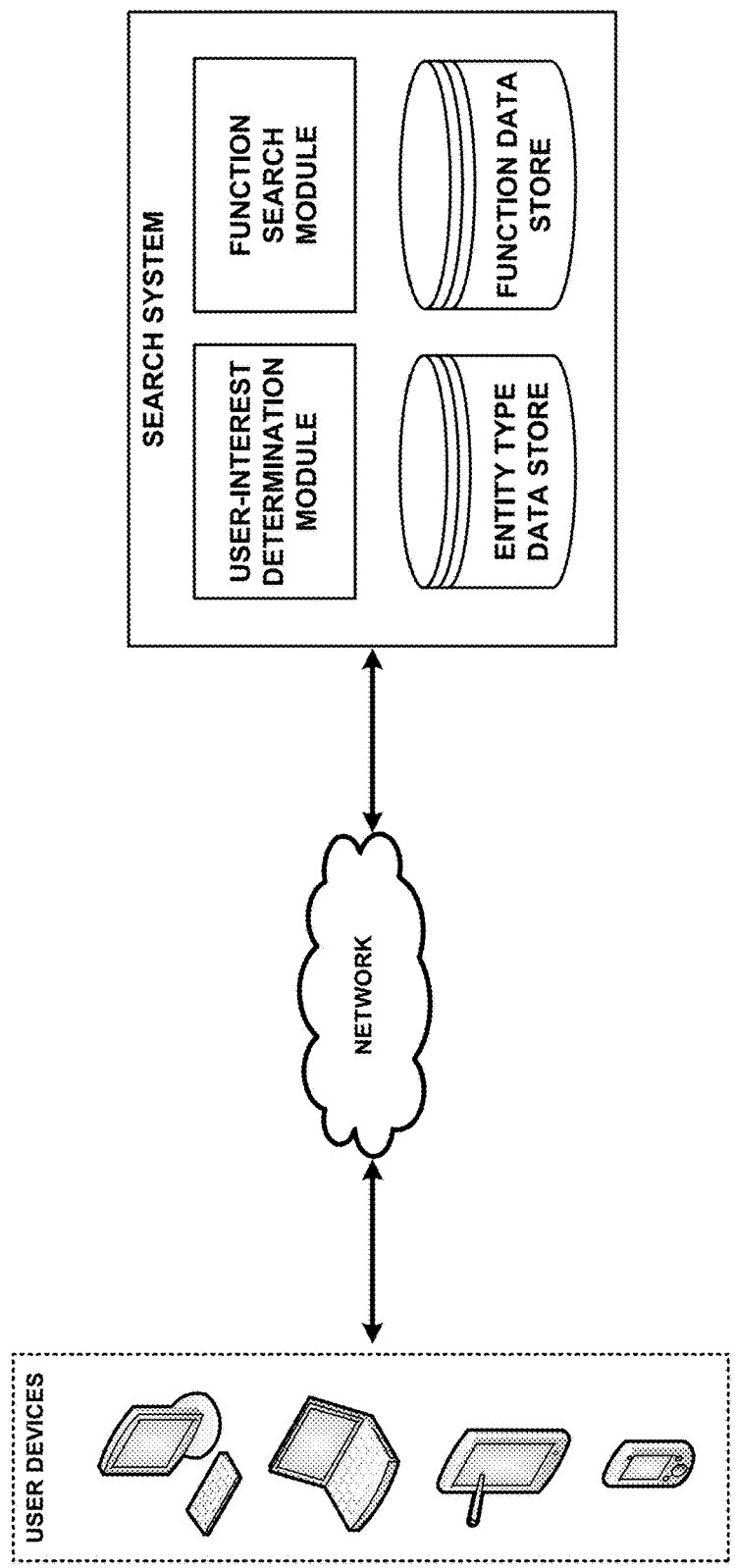
FIGS. 1-2 illustrate an example search system.

A search system of the present disclosure (e.g., FIGS. 1-2) generates search results in response to a received query wrapper (e.g., a user's search query and/or context). Initially, the search system selects the types of entities that may be interesting to a user. The search system then generates one or more access uniform resource locators (URLs) for accessing web/application states associated with the selected entity types. In some implementations, the access URLs may be search URLs (e.g., app-specific search URLs for third party applications) used to search for entities of the selected entity types. By starting the search using entity type selection rather than entity selection, the search system may not be required to index and search through a large amount of different possible entities associated with search queries.

Instead, the search system may find a user's potential areas of interest searching a smaller entity type data store. The system may then lead users to relevant dynamic search results based on the user's potential areas of interest (e.g., entity types).

The search system includes a user-interest determination module (hereinafter "interest determination module") and an entity type data store. The interest determination module determines the user's interests based on the received query wrapper. For example, the interest determination module may determine the user's entity types of interest. The entity type data store includes a plurality of entity type records (e.g., FIGS. 3A-3C) that each include data related to a single entity type. The interest determination module searches the entity type records based on data included in the query wrapper. The interest determination module selects entity types from the entity type records based on how well data in the query wrapper matches data include in the entity type records. The selected entity types represent the user's entity types of interest, as indicated by the query wrapper.

The search system includes a function search module and a function data store. The function search module generates the access URLs associated with the entity types of interest. The function data store includes a plurality of function records (e.g., FIGS. 5A-5B) that each include data related to a function provided by the generated access URLs, such as a search function. For example, the function records may include an entity type associated with the function (e.g., an entity type searched by the search function) and other searchable data (e.g., search terms). The function search module may select function records with entity types that match the entity types of interest, thereby accessing various web/app functionalities associated with the entity types of interest.

The function records may include access URL templates and template rules. The function search module may generate access URLs by completing the access URL template based on the template rules and data included in the query wrapper (e.g., the search query). In some cases, the access URL templates and template rules may be used to generate search URLs. In these cases, the access URL template may be a URL that is completed using the received user search query. In a specific example, if the user's search query is "fine dining," a query for restaurant entities, then the completed access URL may be a search URL for the query "fine dining" in an application that provides search for restaurant entity types.

Figure 6:
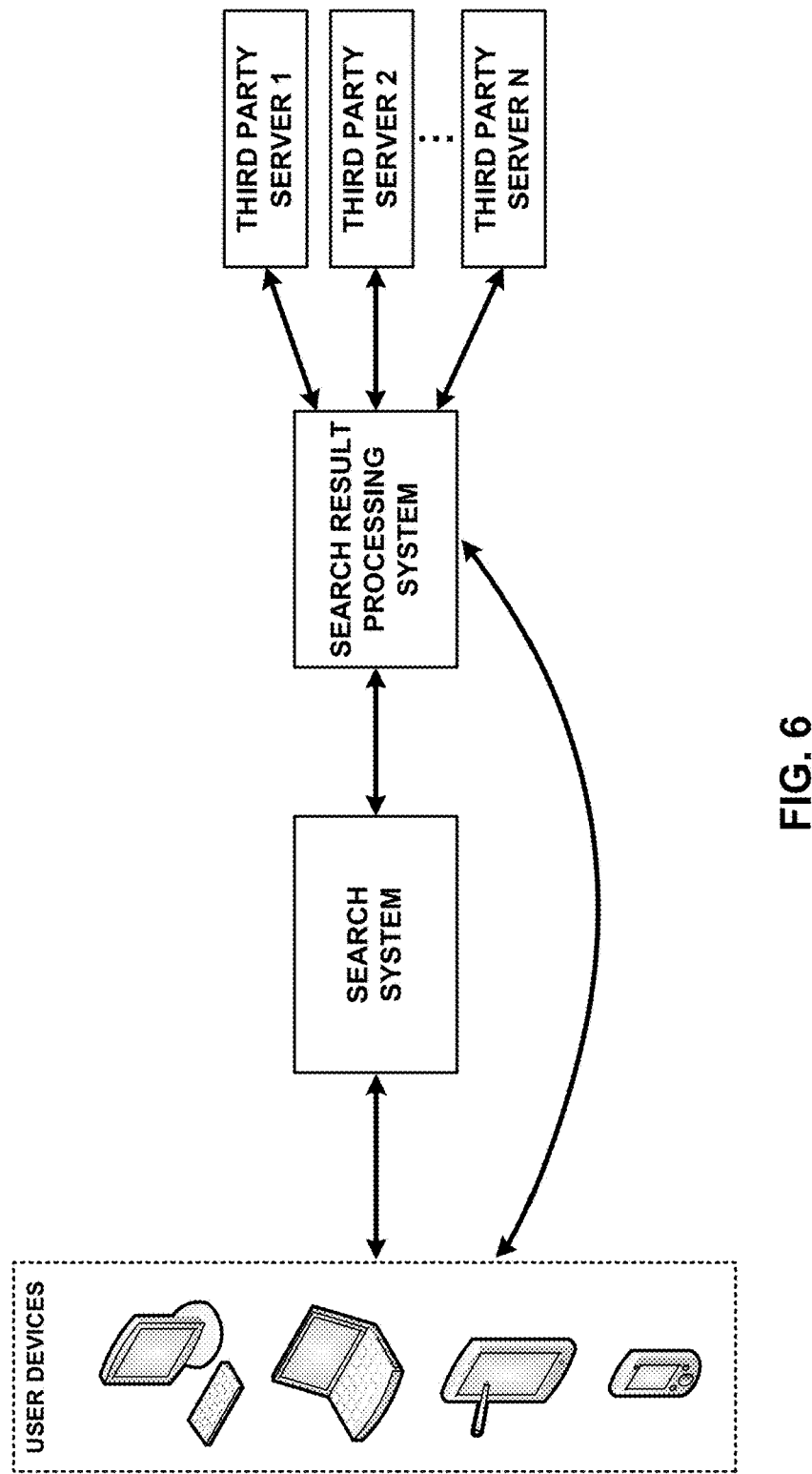
FIG. 6 illustrates an example environment including a search system, a search result processing system, and a plurality of third party servers.

As illustrated in FIG. 6, in some implementations, the search system communicates with a search result processing system (hereinafter "result processing system"). The result processing system may access application functionality using the access URLs generated by the search system, and then generate final search results for transmission to the user device. In some implementations, the result processing system may execute the applications associated with the access URLs (e.g. via emulation). In these cases, the result processing system may input the access URLs into the respective executed applications and use the output of the executed applications in the final search results. In cases where the access URLs include search URLs, the executed applications may retrieve third party search results from third party servers according to the search URLs. The result processing system may then generate the final search results for the user device based on the received third party search results. In this implementation, the search system and result processing system operate as a general purpose real-time search engine that leverages multiple specialized search engines.

The user device may communicate with the search system via the network. The network through which the search system and the user devices communicate may include various types of networks, such as a local area network (LAN), wide area network (WAN), and/or the Internet.

The user device may receive a search query from the user and transmit a query wrapper to the search system that may include the search query and/or contextual data (i.e., context). The search system receives the query wrapper. The context may include geo-location data indicating the user's geolocation and platform data (e.g., OS version and device type). In some cases, the context may include data indicating a state of the user, such as whether the user is walking, driving, near a specific location, or other information.

In some implementations, the user device and/or the search system (e.g., the interest determination module) can translate user context into words for use during search (e.g., for matching terms in the entity type records and function records). For example, the user's location can be translated into a city name. As another example, if the user is near a national monument, such as Mount Rushmore, the user's location can be translated to include the phrase "near Mount Rushmore." Additional contextual phrases may include "near home," "at home," or an indication of where a user has been recently located.

As described herein, in some implementations, the function search module can insert the received search query, or a modified version of the search query, into an access URL template to generate a complete access URL for an application. In cases where the search system does not receive a search query, and instead receives context, the function search module can generate a complete access URL based on the received context (e.g., geolocation and/or user state). The search system may not receive a search query in some cases, such as in an advertisement scenario where user context is used to advertise.

The interest determination module receives the query wrapper. The interest determination module selects one or more entity types based on the query wrapper. The interest determination module outputs a list of the selected entity types. The list of entity types may indicate the entity types that are of interest to the user. Example entity types may include, but are not limited to, a flight entity type, a restaurant entity type, and a movie entity type. In some implementations, the interest determination module may determine a score along with each selected entity type that indicates how relevant the selected entity type is to the received query wrapper. Put another way, the score may indicate a level of confidence that the user is interested in the particular entity type. The score indicating the relevance of the entity type to the query wrapper may be referred to as the "entity type score."

Each of the entity type records may be associated with a single entity type. Accordingly, in some implementations, the entity type data store may include one entity type record for each entity type that can be returned by the interest determination module. An entity type record can include a name of an entity type along with additional information. The interest determination module may select the entity type records based on matches between data in the query wrapper (e.g., query terms) and the information included in the entity type record.

Figure 3C:
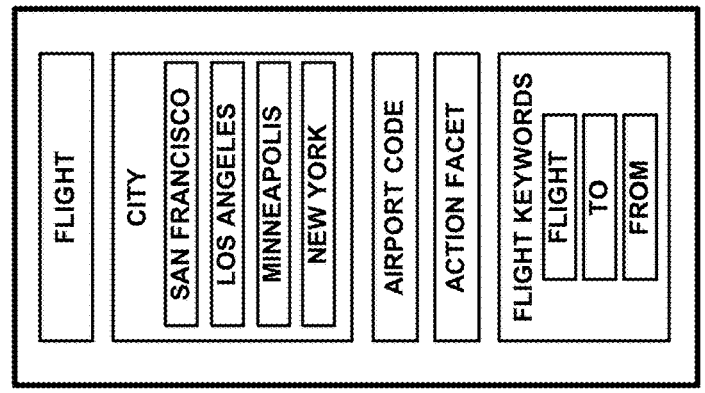
FIGS. 3A-3C illustrate example entity type records.
Figure 3B:
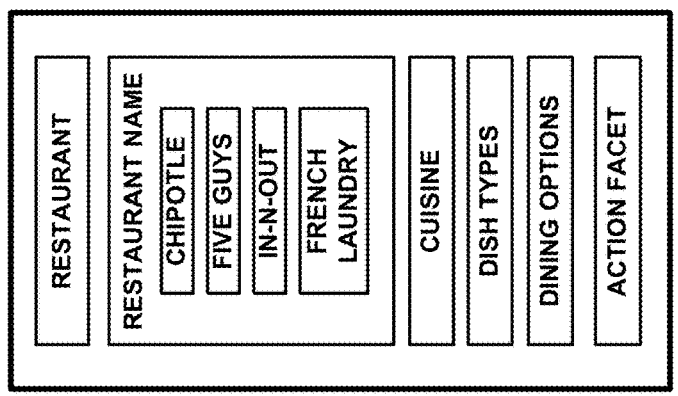
Figure 3A:
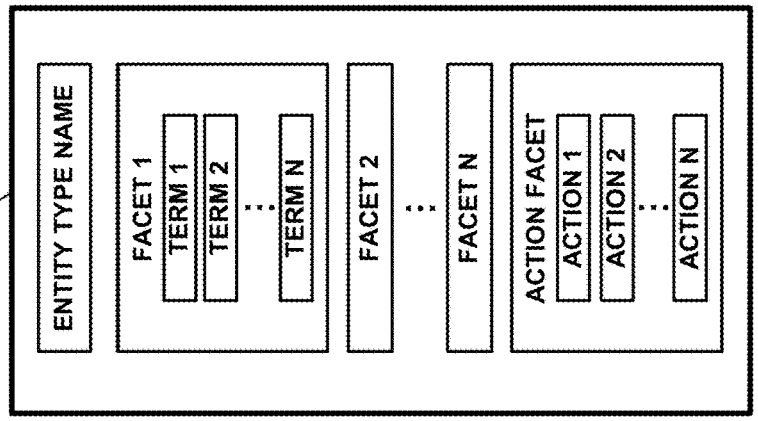

FIGS. 3A-3C illustrate example entity type records. The illustrated entity type records may represent data related to entity types stored in the entity type data store. For example, the illustrated entity type records may represent data in one or more databases, indices (e.g., inverted indices), tables, files, or other data structures which may be used to implement the techniques of the present disclosure. In some implementations, data included in the entity type records may be included in an inverted index in which terms from the entity type records (e.g., facet terms) are mapped to entity types.

An entity type record may include an entity type name indicating the entity type associated with the information included in the entity type record. Example entity type names can include, but are not limited to "Flight," "Restaurant," and "Movie." The entity type record may also include a variety of information related to the entity type represented by the entity type record. In one example, if the entity type record is for the entity type "Restaurant," then the entity type name may be "restaurant," and the entity type record may include information (e.g., terms) related to restaurants (e.g., cuisine types).

An entity type record may include different categories of terms associated with the entity type. The categories of terms associated with the entity type may be referred to herein as "entity type facets." The different entity type facets may include terms that users may use (e.g., frequently) to search for entities associated with the entity type. Put another way, a facet may refer to a category of words that a user may likely search for when interested in the entity type. Facets may also have a facet name that describes/categorizes the terms of the facet. Example facet names may include, but are not limited to, restaurant names, cuisines, dish types, dining options, cities, and airport codes. Although the entity type record may include terms grouped by facets, in some implementations, the entity type record may also include fields for unstructured data.

Separation of words into facets may be representative of a user's behavior when searching for different entity types. For example, when searching for entities of a particular entity type, a user may search for certain types of words that indicate the user's intent to find entities of a particular type. Furthermore, some facets of an entity type may be more common or more indicative of a user's intent to search for entities of a certain type. Accordingly, as described herein, matches between terms of the search query/context and terms in different facets may be treated differently, depending on which facets are matched.

The same type of facet may be present in multiple entity type records. The same type of facet may also have the same list of terms across some entity type records. For example, the city facet may be included in multiple different entity type records, and may include the same list of cities in each of the different entity type records. In other cases, the same types of facets may include different terms in different entity type records. For example, terms than may not be relevant for the entity type can be left out of the facet. In a specific example, city facets included in different entity type records may be different if certain cities are not relevant to the entity type. For example, a navigation entity type record may include a larger list of cities than a flight entity type record because the city facet in the flight entity type record may be limited to cities with airports. In some implementations, a single facet file (e.g., a single city facet file with a list of cities) may be used to populate the different entity type records. In this case, modification of the single facet file may be propagated through the entity type records.

In some implementations, an entity type record may include a facet that lists actions associated with the entity type in some manner. For example, the actions may be verbs that are associated with the entity type, such as verbs that may be commonly used when searching for entities of that entity type, or verbs/phrases indicating actions that can be performed on the entity type (e.g., "reserve a table," "read review," and "order movie"). In some implementations, the actions included in the entity type records may each be chosen from a global action ontology defined by the owner/operator of the search system. The actions chosen from the action ontology can be used in the entity type records as well as the function records. The number of available actions may vary per entity type. In some cases, an entity type may not have associated actions. In other cases, the entity type may be associated with one or more actions.

Actions may include verbs, such as fly, travel, eat, reserve, watch, and listen, for example. In one example, if the entity type is "Flight," then the entity type record may include the action "fly." The fly action may be included in the entity type record because a user may intend to find flights (i.e., flight type entities) when using the word "fly" in the search query. In another example, if an entity type is "restaurant," the "eat" and "reserve" actions may be included in the entity type record because a user may intend to eat at a restaurant and/or reserve a table at a restaurant when using the search words "eat" and "reserve."

In some cases, the search query may include one or more terms that are the same as terms included in the actions of the entity type records. For example, an action word may be included in the search query along with other words that are also included in the entity type record (e.g., words included in other facets). The inclusion of action words in the search query along with other words that match the entity type record may be a stronger indication of user interest than when action words are not present. In some cases, the presence of certain action words may alone be a strong indicator of user interest in the entity type. For example, the words "fly" and "eat" may be strong indicators that the user is searching for flight and restaurant entity types, respectively.

FIG. 3B illustrates an example entity type record for restaurant entity types. The entity name is "Restaurant." The facets include "restaurant name," "cuisine," "dish types," and "dining options." The restaurant names include "Chipotle," "Five Guys," "In-N-Out," and "French Laundry." The restaurant name facet is an example facet that includes explicit entity names associated with the entity type. Such a facet may be a strong facet for scoring. Accordingly, matching terms from the restaurant name facet may generally yield a higher entity type score.

The cuisine types may include "Mexican," "American," "French," and "Thai," among others. Although the cuisine type may be indicative that the user is interested in a restaurant entity type, the terms included in the cuisine type may also be indicative of other entity types not related to restaurants. Accordingly, matches between the search query and cuisine type facet may not yield as high of a scoring boost as matches to the restaurant name facet.

The entity type record also includes facets for dish types and dining options. The dish types may include "Hamburger," "Burrito," "French Fries," and "Crepes," among others. The dining options may include "indoor seating," "outdoor seating," "drive through," and "take out," for example.

The entity type record also includes an action facet that includes actions associated with the restaurant entity type.

Example actions included in the entity type record may include, but are not limited to, "eat," "dine," "order," and "deliver."

FIG. 3C illustrates another example entity type record. The entity type name is "Flight." The entity type record includes a city facet that includes city names (e.g., San Francisco, Los Angeles, Minneapolis, New York, etc.). The entity type record includes an airport code facet that may include airport codes (e.g., SFO, LAX, MSP, and JFK). The entity type record includes actions (e.g., fly and travel). The entity type record also includes a flight keyword list that includes additional words associated with search queries related to flight entity types (e.g., flight, to, and from).

The interest determination module selects entity type records based on the received query wrapper (e.g., the search query and/or context). In order to select entity type records, the interest determination module may score the entity type records based on how well the entity type records match the data in the query wrapper. A larger entity type score may indicate that the selected entity type is more relevant to the search query/context.

The interest determination module can implement a variety of different scoring techniques to generate the entity type score. In some implementations, the interest determination module can implement a scoring function that generates entity type scores based on factors that may include, but are not limited to, the number of terms matched, which facets are matched, the number of facets matched, whether an entity name is matched, and other factors. For example, a greater number of terms/facets matched may tend to result in a larger entity type score because a greater number of term/facet matches may indicate that the entity type record is more relevant to the search query. As another example, matches for different facets may be scored differently (e.g., some facets may be scored higher than others). For example, matches to facets that may be more indicative of user interest may score higher than other facets. As a further example, a match between the search query and the entity type name may also increase the entity type score because inclusion of an entity type name in the search query may be a strong indicator that the entity type record is relevant.

In some implementations, the interest determination module may implement a machine learned model to generate the entity type scores. The machine learned model may be generated using a supervised learning model and/or based on user analytics obtained during operation of the search system.

Different facets can have different weightings within an entity type record. The weightings can be entity type record specific such that a facet is not weighted the same across all entity type records, but can be weighted according to its importance to that entity type. For example, if airport codes are a facet for a taxi entity type and a flight entity type, the weighting for an airport code may be heavier in the flight entity type record than in the taxi entity type record because the airport code in the query may be a strong indicator that the user is looking for a flight, as opposed to a taxi. Initially, the weightings for the facets can be set manually (e.g., by the system operator), and the search system can modify the weightings over time (e.g., based on user analytics).

The entity type records can be created and updated manually and/or automatically. In some implementations, the entity type records may be initially created manually and then updated automatically over time. The facets included in the entity type records may also be generated manually and/or automatically. As described above, some facets may be modified by removing terms that may not be relevant to the entity type. For example, for a flight entity type record, the search system operator may remove a city name from a city facet if the city does not include an airport.

The entity type data can be acquired via crawling and scraping sites and/or via partnerships with data providers, such as application developers and data collection services (e.g., business directories). The number of entity types used may be selected by the system owner/operator and may vary. In some implementations, one thousand or more entity type records may be stored in the entity type data store.

Figure 4:
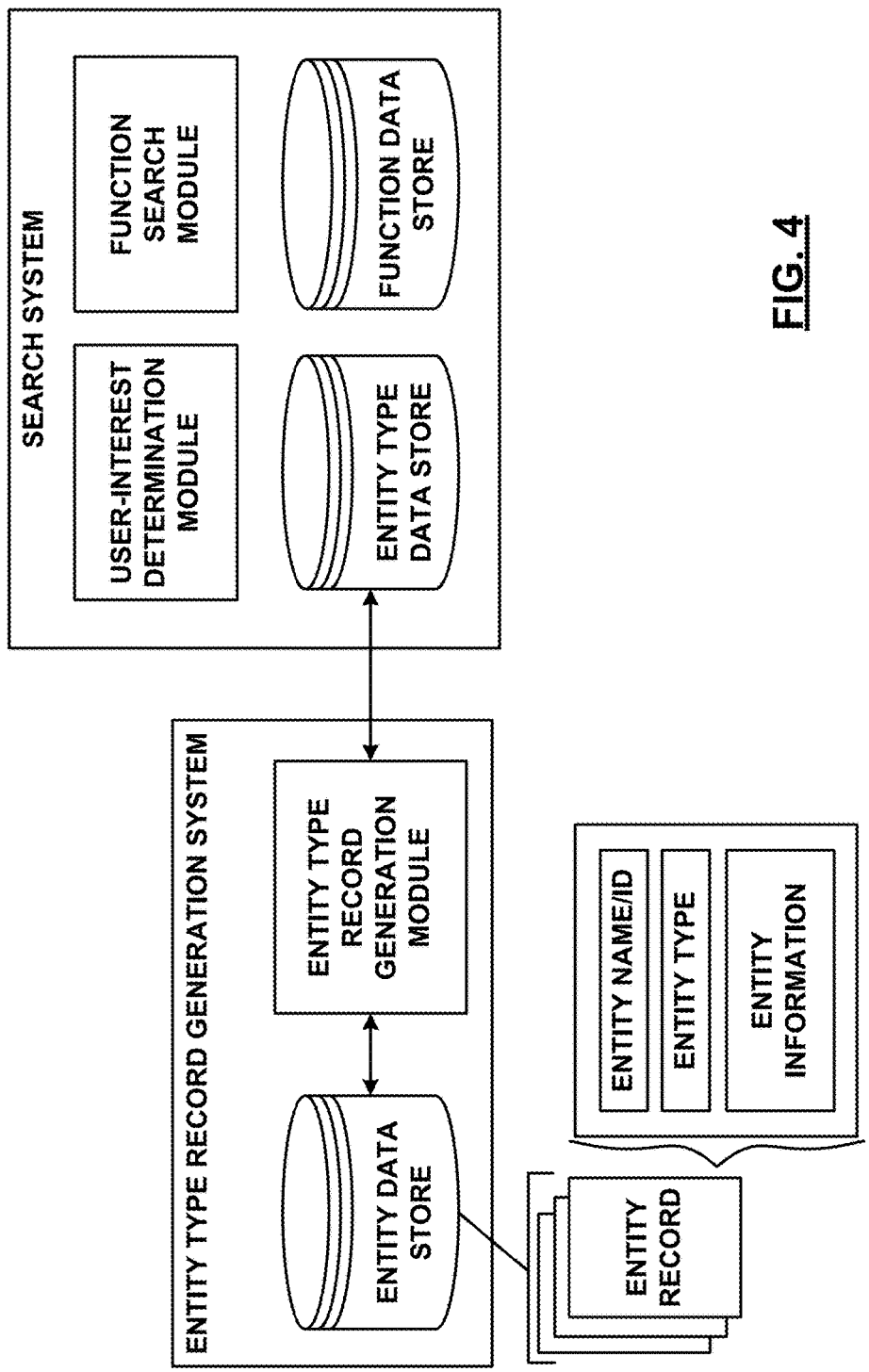
FIG. 4 illustrates an example search system in communication with an example entity type record generation system.

With respect to FIG. 4, in some implementations, the entity type records may be generated from entity records stored in an entity data store. Each of the entity records can include an entity name/ID, an entity type, and additional entity information. An entity name may refer to a noun which denotes a person, animal, place, thing, or idea, such as a business (e.g., restaurant), a product, service, a piece of media content, political organization/figure, public figure, or destination, for example.

Each entity record may include an entity type that may indicate a category of the entity name/ID. The entity information of the entity record may include information describing the entity. The entity information may be separated into different fields. The types of fields included in the entity record may depend on the entity type of the entity record. In one example, an entity record for a restaurant may include the name of the restaurant, the entity type "restaurant," and entity information including fields for a restaurant location, cuisines served at the restaurant, menu items, and other restaurant related information. As another example, an entity record for a movie may include the name of the movie, an entity type "movie," and entity information including fields for the actors in the movie, the director of the movie, the release date of the movie, and other movie related information.

In some implementations, an entity type record generation system (e.g., an entity type record generation module) can create/update entity type records in the entity type data store. In some implementations, the entity type record generation system may create new entity type records when new entity types are introduced in the entity data store. The system may also update data in the entity type records based on data included in the entity data store. For example, if new entity records are added for an existing entity type in the entity data store, the system can update the entity type records to include the newly added information. In a specific example, if a new restaurant entity is added to the entity data store, the system can update the entity type record for restaurants to include the entity name in the entity name field of the restaurant entity type record. Similarly, if an entity record is deleted, the data associated with that entity record (e.g., entity name) can be removed from an entity type record.

The function search module generates one or more access URLs based on at least one of the entity types selected by the interest determination module, the search query, and the context. The access URLs may be search URLs (e.g., app-specific search URLs) that search for entities having the entity types selected by the interest determination module. For example, if the interest determination module selects a restaurant entity type, then the function search module may generate an access URL for a search page of an application including restaurant entities (e.g., a list of restaurants relevant to the search query).

The function search module receives the list of one or more entity types selected by the interest determination module, along with the corresponding entity type scores. The function search module selects one or more function records in the function data store based on the list of one or more entity types, the entity type scores, the search query, and/or the context. For example, the function search module may score function records and select the highest scoring function records. In some implementations, the function search module may search an inverted index of function records to perform the search for the function records.

The function search module generates one or more access URLs based on the selected function records. For example, the function search module may generate one or more access URLs for each function record selected. In order to generate an access URL, the function search module may fill in the access URL template based on the template rules in the function record. For example, the function search module can insert the search query and/or context, or modified forms of the search query and/or context, into the access URL template to generate the access URL for the selected function record. In some cases, the access URL may be a search URL that sets a user device into a state that searches for entities of the type indicated in the function record.

Although the function search module may use the output of the interest determination module, in some implementations, the output of the interest determination module may be a service that is accessible to other third party servers via the network.

Figure 5B:
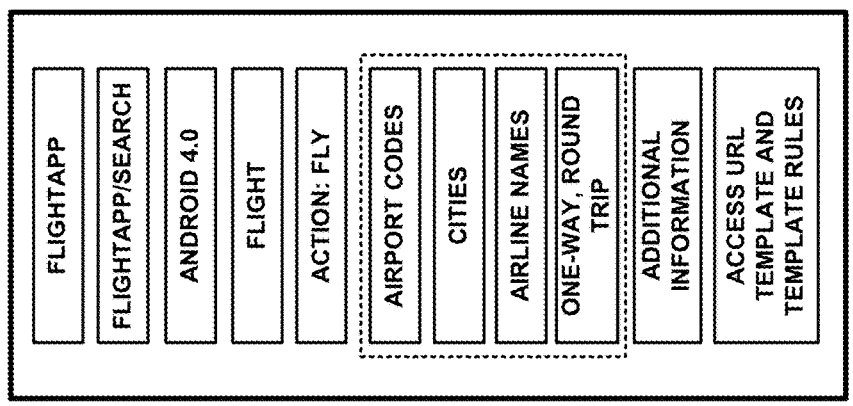
FIGS. 5A-5B illustrate example function records.
Figure 5A:
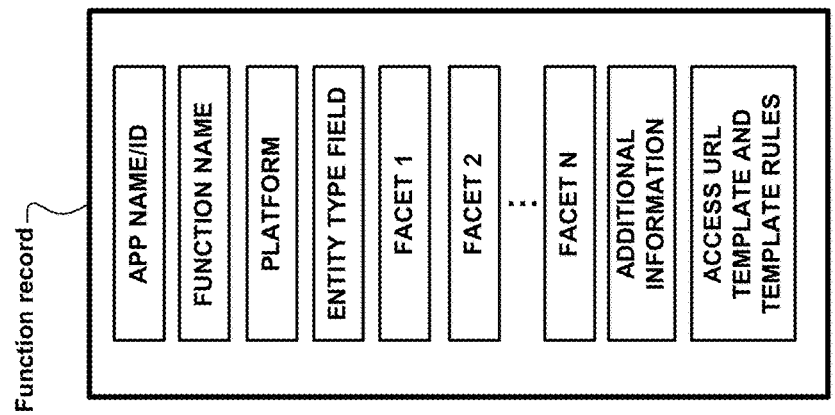

In some implementations, as illustrated in FIG. 5A, a function record may include the following fields: an application name/ID, a function name, a platform, an entity type field, one or more function record facets, and an additional information field. The function record may also include an access URL template and template rules.

The application name/ID may identify the application associated with the function record. For example, the application name/ID may be the application for which the access URL is generated. The function name may be a name selected by a search system operator to identify the function associated with the function record. For example, the function name may include the application name and a human readable function portion. In one example, if the function record generates a search on the Yelp application for restaurants, the function name may include the string Yelp/RestaurantSearch. The platform field may indicate the specific platform (e.g., the OS version and device type) with which the access URL is compatible.

The function record includes an entity type field that indicates the entity type associated with the function record. Although a single entity type is illustrated, in some implementations, more than one entity type may be included.

The one or more function record facets may vary based on the function represented by the record. In general, the function record facets may be generated based on the application state accessed by the completed access URL of the function record. For example, the function facets may be groups of words that are included within the application state accessed by the completed access URL. In a specific example, if the application state includes search results, the facets can be data related to the search results, such as facets related to the entities of the search result. For example, if the function record is for a search that returns links to restaurants, then the facets can be related to restaurants (e.g., cuisine types and restaurant names). In some cases, the function record may include facet types that are similar to the entity type facets described herein (e.g., cities, airport codes, actions, etc.).

In some implementations, if the function record is associated with a searching function (e.g., the access URL is a search URL), the function facets may include a search-specific term facet that includes terms that can be used to define the search (e.g., selected from a menu in the search state). For example, if the search function is a search for flights and the search state allows searching by cities and airport codes, then the function record may include city/airport facets for cities/airport codes that can be used to define the search (e.g., selected from a menu during search). In some implementations, the function records may also include a miscellaneous facet that includes terms that may not otherwise fit into other facets.

The additional information field may include additional information related to the function (e.g., unstructured information). For example, the additional information field may include additional terms not categorized into facets. The additional information field may also include unstructured data that is retrieved from web/app states accessed by the access URL of the function record.

The function record includes an access URL template along with template rules that define how the access URL template is to be completed. In some implementations, the access URL template and template rules may be used to generate a platform specific-access URL that may only work on a specific platform (e.g., OS and/or device type). In other implementations, the function records may include platform independent identifiers (referred to herein as "function IDs"). A function ID may map to a group of access URLs for accessing the same (or similar) function on different platforms (e.g., apps for different operating systems), such as a search function on different platforms. For example, a function ID for a restaurant search on the Yelp application may map to different access URLs for the Yelp application on different operating systems. The function record can include access URL templates and template rules for each of the access URLs on the different platforms.

In some implementations, the function search module can output the function IDs to the user device and/or the result processing system. The user device and/or the result processing system can have the function IDs translated to access URLs for a specific platform at a later time. For example, the function IDs can be translated for the user device based on the platform of the user device, as indicated in the query wrapper. In some cases, the function search module may perform the translation of a function ID to an access URL as a service to other devices. In other cases, another system (not illustrated) may translate the function IDs to access URLs.

An application can be associated with one or more actions. For an application that can perform multiple actions, a first access URL and a second access URL may be associated with a first action and a second action, respectively. For example, an application may be used to both order food from a restaurant and reserve a table at a restaurant. In this example, some states of the restaurant application are associated with the order action and other states are associated with the reserve action. In some implementations, in cases where an application is associated with multiple actions, the function records associated with the application can be assigned the multiple actions, or some subset of the multiple actions. In other implementations where an application is associated with multiple actions, the function records associated with the application can be assigned the actions associated with the specific access URL of the function record. For example, function records for access URLs associated with the reserve action are assigned the reserve action, while function records for access URLs associated with the order action are assigned the order action.

An actions facet may include a set of terms that describe the action performed by the particular function (e.g., the function provided by the access URL). For example, the actions may be words that indicate what a user wants to do with the application and/or how the user wants to interact with an entity type. The same action terms can also be included in the entity type records. The actions can be selected from an ontology of actions used across applications. For example, actions can be assigned to newly developed applications from the ontology. As another example, actions can be assigned/removed from already existing applications as the functionality of the applications are modified over time.

FIG. 5B illustrates an example function record. The function record is for a fictional application named FlightApp that can perform searches for flights. The function record includes the application name FlightApp and platform data indicating the application is for Android version 4.0. The entity type is "Flight." The action facet includes the term "Fly," which is an action associated with flights. The facets for the function record include airport codes, cities with airports, and airline names. The function record also includes a search-specific term facet having flight specific search terms such as "one-way" and "round trip."

The access URL template may be a portion of a web/native app URL that includes a section for inserting the search query string received from the user device. The template rules may include instructions for inserting the user's search query string into the access URL template to form a complete access URL. The complete access URL may launch the FlightApp application and cause the FlightApp application to perform a search (e.g., an in-app search) using the user's search query.

The function record illustrated in FIG. 5B may not be the only function record for the FlightApp application. The FlightApp application may perform a variety of other search functions, such as searches for helicopter tours. The function record for such a search may have a different access URL template and template rules that generate an access URL that performs a helicopter tour search. The function record may also include different facets and facet terms related to searching for helicopter tours, such as different airports, cities, and helicopter tour providers.

The function search module may select the function records based on the entity types selected by the interest determination module and the associated entity type scores. Additionally, or alternatively, the function search module may select the function records based on the search query and/or context. In order to select function records, the function search module may score the function records based on how well the function records match the entity type, search query, and/or context. A higher score may indicate that the selected function is more relevant to the entity type, search query, and/or context. The score indicating the relevance of the function record to the entity type, search query, and/or context may be referred to as the "function score."

In some implementations, the function search module may require that the entity type field match one of the entity types selected by the interest determination module before selecting the function record. In other implementations, the function search module may not require that the entity type is matched, but instead, the function search module may boost the scoring of the function record if the entity types of the function record matches one of the entity types selected by the interest determination module.

The function search module can implement a variety of different scoring techniques to generate the function score. In some implementations, the function search module can implement a scoring function that generates function scores based on factors that may include, but are not limited to, whether the entity type is matched, the number of terms matched, which function facets are matched, the number of function facets matched, and other factors. For example, the function search module may be configured to generate a greater function score if an entity type is matched since an entity type match may indicate that the function (e.g., search function) is more relevant to the user. As another example, a greater number of terms/facets matched may tend to result in a greater function score because a greater number of term/facet matches may indicate that the function record is more relevant to the search query and/or context. As another example, matches for different facets may be scored differently (e.g., some facets may be scored higher than others).

In some implementations, the function search module may implement a machine learned model to generate the function scores. The machine learned model may be generated using a supervised learning model and/or based on user analytics obtained during operation of the search system.

Different function facets can have different weightings within a function record. In some cases, the weightings can be function record specific such that similar function facets are not weighted the same across all function records, but can be weighted according to their importance to that function. The function search module can modify the weightings over time (e.g., based on user analytics).

As described above, the function search module generates one or more access URLs for the selected function records by executing the instructions included in the template rules. In some implementations, the function search module transmits the access URLs to the user device for display as search results on the user device. In these implementations, the function search module may transmit the access URLs along with other data for rendering the search engine results page (SERP). In other implementations, the result processing system can use the access URLs to access application states and perform additional searching operations before transmitting the final search results to the user device.

FIG. 6 illustrates an example environment in which the search system transmits the search results (e.g., the scored access URLs) to a result processing system. In this environment, the search results generated by the search system may be referred to as "preliminary search results," as final search results may be generated at a later time. The result processing system may be operated by the same party as the search system. In some implementations, the search system and the result processing system can be executed on the same server or collocated servers.

The result processing system may use the access URLs to access the functionality of the corresponding applications. In some implementations, the result processing system may execute one or more of the applications associated with the access URLs. For example, the result processing system may emulate the applications. In the case of search access URLs, the result processing system can query the third party application servers using the search access URLs and receive search responses (referred to herein as "third party results") from the third party servers. In some cases, the third party results can include data for rendering search results (e.g., HTML data). In other cases, the third party results may include data that the result processing system further processes to generate the final search results (e.g., JSON data).

The result processing system may transmit the third party results to the user device as the final search results. In some implementations, the result processing system may perform further operations on the received third party results before transmitting the third party results as the final search results. For example, the result processing system may score and re-rank the third party results based on a variety of scoring factors. The scores assigned by the result processing system to the final search results may be referred to as "result scores." The result processing system may score and rank the third party results based on factors including, but not limited to, the function score associated with the third party results, the response time from the third party servers, and matches between the search query/context and the content (e.g., terms) of the third party results. In some implementations, the result processing system may not transmit results to the user device if the results have less than a threshold result score.

The result processing system may determine whether to transmit the third party results based on when the third party servers respond. For example, if third party results are not received by the result processing system within a threshold period of time, the result processing system may exclude the results from the final search results. In another example, if a third party server responds quickly to the result processing system (e.g., less than a threshold period of time, such as less than 200 ms), the third party results may be immediately transmitted to the user device and/or boosted in the rankings.

In some implementations, the result processing system may asynchronously transmit search results to the user device. For example, the result processing system may transmit the third party search results as they are received by the result processing system. In other implementations, the result processing system may wait (e.g., a threshold amount of time) to receive third party results, and then transmit the results together to the user device. The final search results may be grouped by application. For example, a set of search results (e.g., 3-5 results) may be transmitted to the user device for each application represented in the group of selected function records.

Figure 7:
FIG. 7 illustrates an example user interface including user selectable links for final search results.

FIG. 7 illustrates an example GUI that includes final search results for the Yelp and TripAdvisor applications. Three results are grouped per application. The user device renders the final search results as user-selectable links to the respective states. Each of the user selectable links may include an access URL for the specific state (e.g., the IHOP, Denny's, and Taco Bell states of Yelp). A user may select (e.g., touch) a user selectable link to access the specific state associated with the access URL. For example, the user may select the TripAdvisor Perkins link to launch the TripAdvisor application and set the TripAdvisor application into a state for the Perkins restaurant (e.g., a description/review of Perkins).

Figure 8:
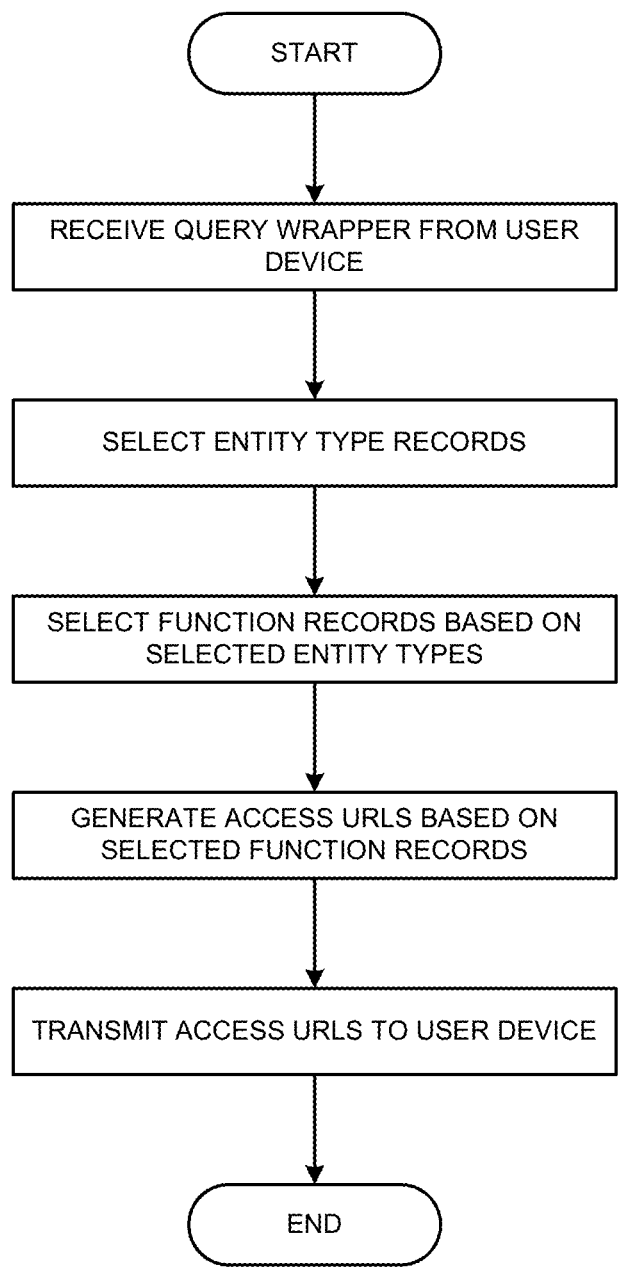
FIGS. 8-9 illustrate example methods for generating search results based on identified entity types.

FIG. 8 illustrates a method for generating search results based on identified entity types. Initially, the interest determination module receives the query wrapper from the user device. The interest determination module selects entity type records based on data included in the query wrapper. The function search module then selects function records based on at least one of the search query, context, and the selected entity types. The function search module generates access URLs for the selected function records. The function search module may then transmit the access URLs to the user device. In some implementations, the function search module may transmit the access URLs to the result processing system for further processing. In these implementations, the result processing module may perform further processing of the access URLs (e.g., via communication with third party servers and/or scoring/re-ranking) and transmit the final search results to the user device.

Figure 9:
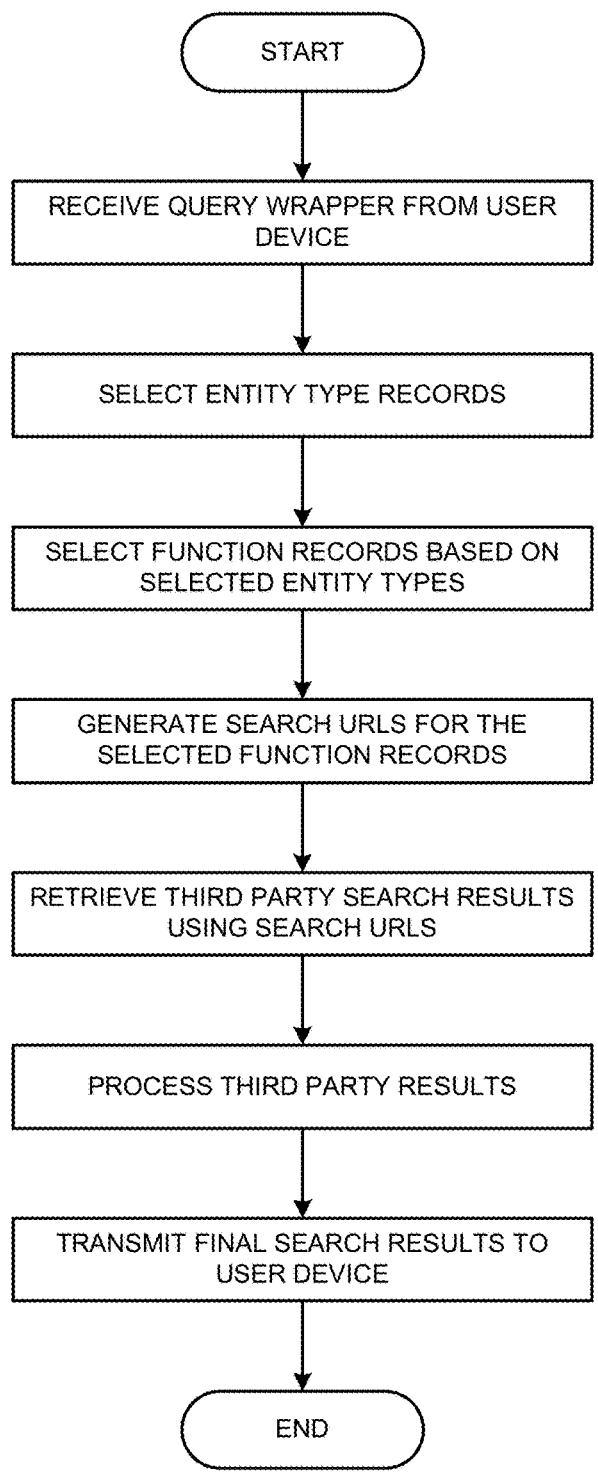

FIG. 9 illustrates a method for generating search results based on identified entity types, where final search results received at the user device are a combination of different third party search results. Initially, the interest determination module receives the query wrapper from the user device. The interest determination module selects entity type records based on data included in the query wrapper. The function search module then selects function records based on at least one of the search query, context, and the selected entity types. The selected function records include search URL templates. The function search module generates search URLs for the selected function records. The function search module may then transmit the search URLs to the result processing system. The result processing system retrieves third party search results using the search URLs. The result processing system processes (e.g., scores and ranks) the received third party results to generate final search results. The result processing system transmits the final search results to the user device.

In some cases, the environment (e.g., FIG. 1 and FIG. 4) can include a function record generation system (not shown) that generates function records. In some implementations, the user may interact with the function record generation system to manually create/update the function records. The function record generation system may also automatically create/generate function records.

The entity type record generation system and the function record generation system may retrieve some of the data to be included in the entity type records and function records from the internet (e.g., websites/web applications) and/or native applications via web and/or native application crawling. For example, the systems may generate fields, such as the additional information fields (e.g., unstructured data) in the function records, in this manner. The data for search-specific term facets may also be retrieved from the web/application states automatically. For example, the function record generation system can analyze a variety of search states associated with the function record and identify the various search options (e.g., search menus and filters) to determine which terms should be included in the search-specific term facet. In a more specific example, for an application that performs flight searches, the function record generation system may identify the city and airport code search inputs on the search page as search-specific term facets.

With respect to the actions field of the function record, in some cases, the actions can be manually assigned at the application level and then subsequently assigned to the function records automatically based on the applications associated with the function records. For example, if a video application is associated with the actions "watch," "download," and "buy," then the function record generation system can automatically assign these actions to the function records associated with the video application.

In some implementations, the entity type record generation system and the function record generation system can perform analysis (e.g., semantic analysis) on the accessed web/application states in order to create/update portions of the entity type records and function records automatically, such as entity type names, facet types, and facet terms, such as action terms. For example, the function record generation system may identify actions based on data (e.g., descriptive text) associated with the interface items (e.g., buttons) of the accessed states.

The entity type records and function records may include fields that are not illustrated in the figures. In some implementations, the function records may include sample queries and sample responses. The sample queries may be a list of queries that is manually and/or automatically generated. For example, a human operator may input the queries into the sample queries field in the function record. Alternatively, the environment (e.g., FIG. 6) may include a sampling system (not shown) that may automatically add queries to the sample queries field (e.g., based on entity types, the popularity of the query, the relevance of the query to the function, or other parameters).

For a function record, the sampling system may generate access URLs using the sample queries and the access URL template. The sampling system may access application functionality using each of the access URLs. The applications may return third party responses. The sampling system may then store some, or all, of the third party responses in the sample responses field of the function record. In some cases, the sampling system may analyze the received responses and select the terms to include in the sample responses field. For example, the sampling system may select the most commonly occurring terms in the third party responses for inclusion into the sample responses field. In an example where the access URLs are search URLs, the third party responses may include search results and other search state information (e.g., search menus, search filters, etc.). In this example, the sampling system may store terms from the search result pages of the application (e.g., search-specific terms) in the sample response field. In a specific example where sample queries are entered into a flight search function, sample responses for flight search queries may include search page words, such as "reviews," "on time arrival," "WiFi on flight," or other words.

Figure 2:
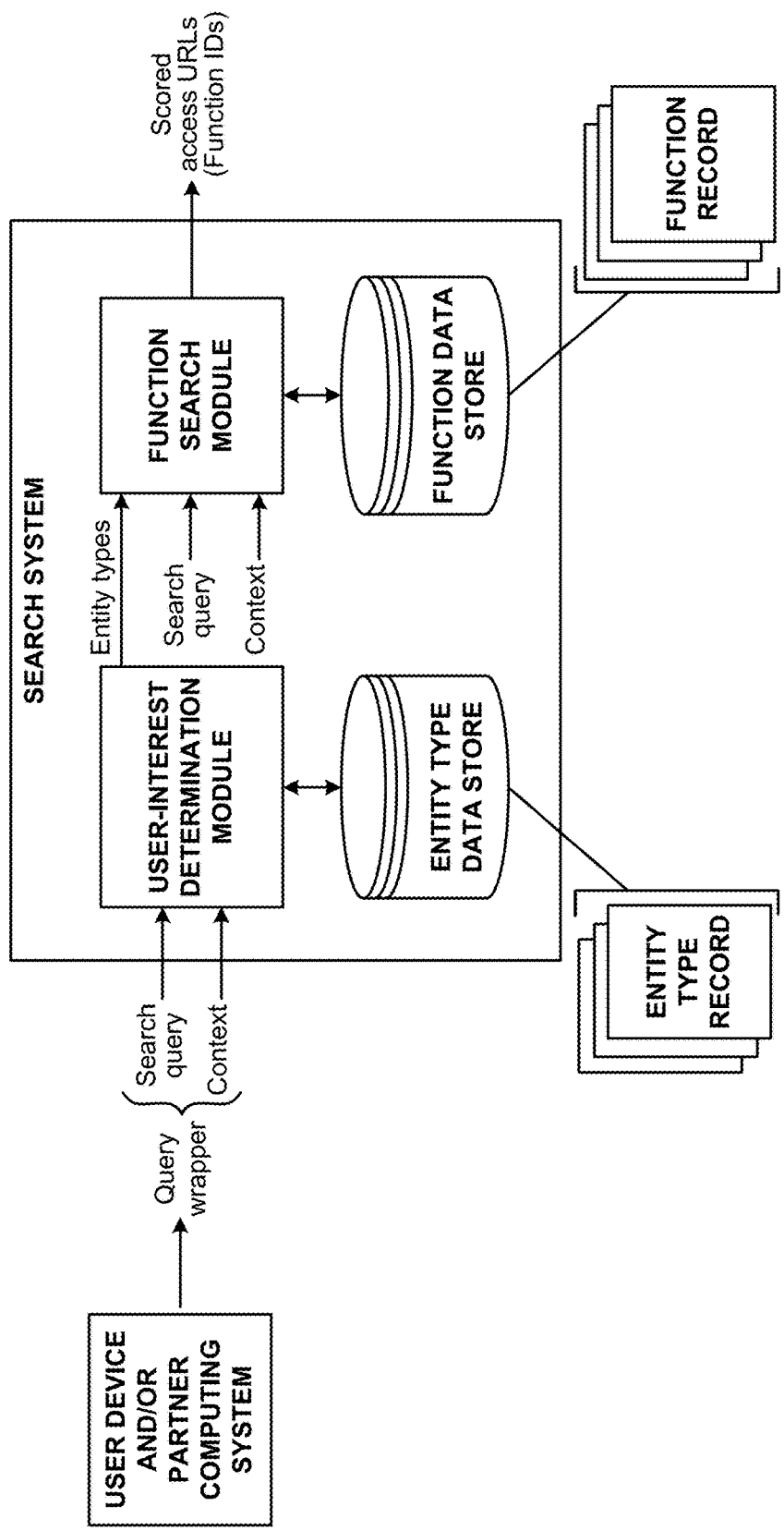

In some examples, as illustrated in FIG. 2, the user devices may communicate with the search system via a partner computing system. The partner computing system may be a computing system of a third party that may leverage the search functionality of the search system. The partner computing system may belong to a company or organization other than that which operates the search system. Example third parties that may leverage the functionality of the search system may include, but are not limited to, internet search providers and wireless communications service providers. The user devices may send search queries to the search system via the partner computing system and also receive search results via the partner computing system. The partner computing system may provide a user interface to the user devices in some examples and/or modify the search experience provided on the user devices.

Modules and data stores included in the systems represent features that may be included in the systems of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the records of the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems may be systems of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems may be configured to communicate with the network. The one or more computing devices of the systems may also be configured to communicate with one another (e.g., via another computer network). In some examples, the one or more computing devices of the systems may include one or more server computing devices configured to communicate with user devices (e.g., receive query wrappers and transmit search results), gather data from data sources, index data, store the data, and store other documents. The one or more computing devices may reside within a single machine at a single geographic location in some examples. In other examples, the one or more computing devices may reside within multiple machines at a single geographic location. In still other examples, the one or more computing devices of the systems may be distributed across a number of geographic locations.

As used herein, the phrase at least one of A, B, and C should be construed to mean a logical (A OR B OR C), using a non-exclusive logical OR, and should not be construed to mean "at least one of A, at least one of B, and at least one of C." In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A method comprising:
receiving a search query from a user device via a network;
selecting a plurality of entity type records included in an entity type data store based on the received search query, each of the plurality of entity type records including:
an entity type name, and
one or more entity type facets, each of which include terms that are descriptive of the entity type name, wherein selecting the plurality of entity type records includes identifying matches between terms in the one or more entity type facets and terms of the search query and selecting the plurality of entity type records based on the identifying of the matches between the terms in the one or more entity type facets and the terms of the search query;
selecting a plurality of function records included in a function data store based on at least one of the search query or the entity type names from the selected plurality of entity type records, each of the plurality of function records including:
an entity type field including one or more entity type names,
an access uniform resource locator (URL) template and instructions for completing the access URL template to form a completed access URL, wherein the instructions for completing the access URL template includes instructions for inserting the search query into the access URL template, and
one or more function facets including terms that are descriptive of an application state accessed using the completed access URL, wherein selecting the plurality of function records includes identifying matches between terms in the one or more function facets and terms of the search query and selecting the plurality of function records based on the identifying of the matches between the terms in the one or more function facets and the terms of the search query; and transmitting search results to the user device via the network, the search results including the completed access URLs from the selected function records.

2. The method of claim 1, further comprising selecting the plurality of function records based on matches between the entity type names of the selected plurality of entity type records and the entity type names of the entity type fields in the function records.

3. The method of claim 1, further comprising selecting the plurality of function records based on matches between the search query and terms of the one or more function facets.

4. The method of claim 1, further comprising generating the entity type records in the entity type data store based on entity records included in an entity data store, wherein each of plurality of the entity records includes an entity name, an entity type indicating a category of the entity name, and entity information related to the entity name.

5. A method comprising:

receiving a search query from a user device via a network;

selecting a plurality of entity type records included in an entity type data store based on the received search query, each of the plurality of entity type records including:
- an entity type name, and
- one or more entity type facets, each of which include terms that are descriptive of the entity type name, wherein selecting the plurality of entity type records includes identifying matches between terms in the one or more entity type facets and terms of the search query and selecting the plurality of entity type records based on the identifying of the matches between the terms in the one or more entity type facets and the terms of the search query;

selecting a plurality of function records included in a function data store based on at least one of the search query or the entity type names from the selected plurality of entity type records, each of the plurality of function records including:
- an entity type field including one or more entity type names; an access uniform resource locator (URL) template and instructions for completing the access URL template to form a completed access URL, wherein the instructions for completing the access URL template includes instructions for inserting the search query into the access URL template, and
- one or more function facets including terms that are descriptive of an application state accessed using the completed access URL, wherein selecting the plurality of function records includes identifying matches between terms in the one or more function facets and terms of the search query and selecting the plurality of function records based on the identifying of the matches between the terms in the one or more function facets and the terms of the search query;

accessing application states using the completed access URLs of the plurality of function records;

generating a final set of search results based on the accessed application states; and transmitting the final set of search results to the user device via the network.

6. The method of claim 5, wherein the completed access URLs are search URLs, and wherein the accessing of the application states includes: performing a plurality of third party searches using the search URLs.

7. The method of claim 6, wherein the generating of the final set of search results includes selecting a set of third party search results, and wherein the transmitting of the final set of search results to the user device includes transmitting the selected set of third party search results.

8. The method of claim 6, further comprising generating the completed access URLs by including terms from the search query into the access URL template according to the instructions.

9. The method of claim 6, wherein generating the final set of search results includes selecting a set of third party search results and scoring the set of third party search results; and wherein the transmitting of the final set of search results to the user device includes transmitting the selected and scored set of third party search results.

10. A search system, comprising:

at least one processing unit; and a computer readable medium including first instructions executed by the at least one processing unit to perform a method for:

receiving a search query from a user device via a network, selecting a plurality of entity type records included in an entity type data store based on the received search query, each of the plurality of entity type records including:
- an entity type name, and
- one or more entity type facets, each of which include terms that are descriptive of the entity type name, wherein selecting the plurality of entity type records includes identifying matches between terms in the one or more entity type facets and terms of the search query and selecting the plurality of entity type records based on the identifying of matches between the terms in the one or more entity type facets and the terms of the search query, selecting a plurality of function records included in a function data store based on at least one of the search query or the entity type names from the selected plurality of entity type records, each of the plurality of function records including:
- an entity type field including one or more entity type names,
- an access uniform resource locator (URL) template and second instructions for completing the access URL template to form a completed access URL, wherein the instructions for completing the access URL template includes instructions for inserting the search query into the access URL template, and
- one or more function facets including terms that are descriptive of an application state accessed using the completed access URL, wherein selecting the plurality of function records includes identifying matches between terms in the one or more function facets and terms of the search query and selecting the plurality of function records based on the identifying of the matches between the terms in the one or more function facets and the terms of the search query, and transmitting search results to the user device via the network, the search results including the completed access URLs from the selected function records.

11. The search system of claim 10, wherein the first instructions further include instructions for selecting the plurality of function records based on matches between the entity type names of the selected plurality of entity type records and the entity type names of the entity type fields in the function records.

12. The search system of claim 10, wherein the first instructions further include instructions for selecting the plurality of function records based on matches between the search query and terms of the one or more function facets.

13. The search system of claim 10,
wherein the first instructions further include instructions for generating the entity type records in the entity type data store based on entity records included in an entity data store, and
wherein each of the plurality of entity records includes an entity name, an entity type indicating a category of the entity name, and entity information related to the entity name.

14. The search system of claim 10,
wherein the first instructions further include instructions for:
accessing application states using the completed access URLs of the plurality of function records, and
generating a final set of search results based on the accessed application states, and
wherein the first instructions for transmitting search results to the user device via the network includes instructions for transmitting the final set of search results to the user device via the network.

15. The search system of claim 14,
wherein the completed access URLs are search URLs,
wherein the first instructions for accessing the application states include instructions for:
performing a plurality of third party searches using the search URLs, and
receiving third party search results from the third party searches, and
wherein the first instructions for generating a final set of search results include instructions for generating the final set of search results based on the third party search results.

16. The search system of claim 15,
wherein the first instructions for generating the final set of search results include instructions for selecting a set of third party search results, and
wherein the first instructions for transmitting the final set of search results to the user device include instructions for transmitting the selected set of third party search results.

17. The search system of claim 15, wherein the first instructions for generating the completed access URLs include instructions for generating the completed access URLs by including terms from the search query into the access URL template according to the second instructions.

18. The search system of claim 15,
wherein the first instructions for generating the final set of search results include instructions for selecting a set of third party search results and scoring the set of third party search results, and
wherein the first instructions for transmitting the final set of search results to the user device include instructions for transmitting the selected and scored set of third party search results to the user device.

* * * * *